(12) United States Patent
Motomura

(10) Patent No.: US 6,260,336 B1
(45) Date of Patent: Jul. 17, 2001

(54) CUTTER CLEANING DEVICE FOR CHARGING MACHINE

(75) Inventor: Tatsumi Motomura, Ageo (JP)

(73) Assignee: Tetra Laval Holdings & Finance, S.A. (CH)

( * ) Notice: Subject to any disclaimer, the term of this patent is extended or adjusted under 35 U.S.C. 154(b) by 0 days.

(21) Appl. No.: 09/242,732

(22) PCT Filed: Sep. 3, 1997

(86) PCT No.: PCT/JP97/03077

§ 371 Date: Dec. 8, 1999

§ 102(e) Date: Dec. 8, 1999

(87) PCT Pub. No.: WO98/09870

PCT Pub. Date: Mar. 12, 1998

(30) Foreign Application Priority Data

Sep. 3, 1996 (JP) .................................................. 8-233260

(51) Int. Cl.⁷ .......................................................... B65B 9/06
(52) U.S. Cl. ................................ 53/551; 53/552; 53/553; 53/554
(58) Field of Search ............................. 53/551, 552, 553, 53/554, 550; 493/302; 83/168, 169, 945

(56) References Cited

U.S. PATENT DOCUMENTS

| | | | |
|---|---|---|---|
| 3,256,647 | * 6/1966 | Hutton | 83/189 |
| 3,807,118 | * 4/1974 | Pike | 53/29 |
| 3,927,588 | * 12/1975 | Laderach | 83/15 |
| 4,003,276 | * 1/1977 | Schmitt | 83/168 |
| 4,312,253 | * 1/1982 | Johnson et al. | 83/168 |
| 4,414,783 | * 11/1983 | Vincent | 83/169 |
| 4,729,210 | * 3/1988 | Galliano | 53/441 |
| 4,807,361 | * 2/1989 | Raczkowski | 83/169 |
| 4,830,553 | * 5/1989 | Abeyta et al. | 83/168 |
| 5,084,972 | * 2/1992 | Waugh | 83/168 |
| 5,167,215 | * 12/1992 | Harding | 83/168 |
| 5,265,507 | * 11/1993 | Noda et al. | 83/169 |
| 5,673,534 | * 10/1997 | Fowler | 53/552 |
| 5,765,386 | * 6/1998 | Hall et al. | 83/171 |
| 5,768,852 | * 6/1998 | Terminella et al. | 53/552 |
| 5,822,949 | * 10/1998 | Naoi | 53/55 |

\* cited by examiner

Primary Examiner—Peter Vo
Assistant Examiner—Sam Tawfik
(74) Attorney, Agent, or Firm—Lorusso & Loud

(57) ABSTRACT

A cutter cleaning apparatus for a filling machine which prevents liquid food adhering to the cutting knife from dirtying cut ends of packaging material. A web-shaped packaging material is continuously sealed in the longitudinal direction thereof to be formed into a tubular shape, a liquid food is charged into the tubular packaging material (11), and the tubular packaging material (11) is nipped from opposite lateral sides at a position below the surface of the liquid food, so that a laterally sealed portion (S) is formed. Subsequently, the laterally sealed portion (S) is cut in order to obtain an original-shape container. The cutter cleaning apparatus includes a cutting knife (21) for cutting the laterally sealed portion (S), and cleaning medium supply means for supplying a cleaning medium to the tip end of the cutting knife (21). When the laterally sealed portion (S) is cut by the cutting knife (21), part of the liquid food remaining inside the tubular packaging material (11) leaks out and adheres to the cutting knife (21). However, since the cleaning medium is supplied to the cutting knife (21) by the cleaning medium supply means, the cutting knife (21) is cleaned immediately.

13 Claims, 11 Drawing Sheets

CUTTER CLEANING DEVICE FOR CHARGING MACHINE

TECHNICAL FIELD

The present invention relates to a cutter cleaning apparatus for a filling machine.

BACKGROUND ART

In a conventional filling machine, brick-shaped packaging containers filled with a liquid food such as milk or soft drink are produced in a manner in which a web-shaped packaging material made of flexible laminate is continuously formed into a tubular shape while being transported, and the liquid food is charged into the tubular packaging material.

To this end, a web-shaped packaging material set to the filling machine in the form of a reel is pulled out by drive mechanism disposed at a plurality of locations in the filling machine, so that the packaging material is transformed within the filling machine and sealed longitudinally into a tubular shape. In this case, the packaging material has a laminar structure composed of paper substrate, films covering both faces of the paper substrate, and aluminum foil optionally disposed between the paper substrate and the film.

While the tubular packaging material is transported downward, liquid food is charged into the packaging material from above. To tubular packaging material is then nipped from opposite lateral sides at a position below the surface of the liquid food, so that the tubular packaging material is sealed laterally at predetermined intervals. Thus, a series of original-shape packaging containers having a pillow-like shape, a bag-like shape, or any other shape are fabricated.

Subsequently, in order to separate the original-shape containers from each other, the tubular packaging material is cut, through use of a cutting knife, at each laterally sealed portion, i.e., at a position between two seal lines formed at each laterally sealed portion.

Each of the separated original-shape containers is folded along preset creases into a desired shape. Thus are completed a plurality of packaging containers, each containing the same amount of liquid food.

In the above-described conventional filling machine, when the laterally sealed portion is cut, the liquid food may adhere to the cutting knife, with the result that the adhered liquid from dirties the cut ends of the packaging material.

An object of the present invention is to solve the above problem of the conventional filling machine and to provide a cutter cleaning apparatus for a filling machine which prevents liquid food adhering to the cutting knife from dirtying cut ends of packaging material.

DISCLOSURE OF THE INVENTION

To achieve the above object, in the cutter cleaning apparatus for a filling machine according to the present invention, a web-shaped packaging material is continuously sealed longitudinally to be formed into a tubular shape, a liquid food is charged into the tubular packaging material, the tubular packaging material is nipped from opposite lateral sides at a position below the surface of the liquid food, so that the tubular packaging material is laterally sealed, and the laterally sealed portion is cut in order to obtain an original-shape container.

The cutter cleaning apparatus includes a cutting knife for cutting the laterally sealed portion, and cleaning medium supply means for supplying a cleaning medium to the cutting knife.

When the laterally sealed portion is cut by the cutting knife, part of the liquid food remaining inside the tubular packaging material leaks out and adheres to the cutting knife. However, since the cleaning medium is supplied to the cutting knife by the cleaning medium supply means, the cutting knife is cleaned immediately.

Accordingly, the liquid food adhering to the cutting knife is prevented from dirtying cut ends of packaging material.

In another cutter cleaning apparatus for a filling machine according to the present invention, the cleaning medium supply means comprises a closed space that surrounds at least the tip end of the cutting knife, and a cleaning medium passage connected to the closed space and adapted to supply the cleaning medium to the closed space.

In still another cutter cleaning apparatus for a filling machine according to the present invention, the cutting knife is composed of a knife body and a knife holder for supporting the knife body, and the closed space surrounds the knife body and the knife holder.

In this case, the cutting knife is cleaned by the cleaning medium supplied to the closed space.

In still another cutter cleaning apparatus for a filling machine according to the present invention, the cutting knife is composed of a knife body, and a knife holder which is disposed to be slidable relative to the housing and which supports the knife body.

The cleaning medium supply means comprises a closed space that is formed on the rear side of a sliding portion between the knife holder and the housing, and a cleaning medium passage connected to the closed space and adapted to supply the cleaning medium to the closed space.

Further, a groove is formed in the knife holder to supply the cleaning medium from the closed space to the front side of the sliding portions.

In this case, since the space surrounding the cutting knife is not required to be filled with the cleaning medium, the amount of the cleaning medium to be used can be reduced. In addition, since the supply of the cleaning medium does not have to be controlled, the structure of the cutter cleaning apparatus can be simplified.

In still another cutter cleaning apparatus for a filling machine according to the present invention, the cleaning medium supply means comprises a cleaning medium jetting opening disposed in the vicinity of the tip end of the cutting knife, a cleaning medium passage connected to the cleaning medium jetting opening and adapted to supply the cleaning medium to the cleaning medium jetting opening, and a cleaning medium drain passage for draining the cleaning medium after cleaning.

In this case, the cutting knife is cleaned by the cleaning medium jetted from the cleaning medium jetting opening.

In still another cutter cleaning apparatus for a filling machine according to the present invention, the cleaning medium supply means comprises a main cleaning medium jetting opening disposed in the vicinity of the laterally sealed portion, and a sub cleaning medium jetting opening disposed in the vicinity of the cutting knife.

In this case, the cutting knife is cleaned by the cleaning medium jetted from the main and sub cleaning medium jetting openings.

In still another cutter cleaning apparatus for a filling machine according to the present invention, there are provided a seal block disposed in the vicinity of the laterally sealed portion, a pair of heating means disposed on the seal block, and a pair of dollies disposed to face the seal block and adapted to press the packaging material filled with the liquid food.

The cutting knife is disposed between the dollies such that are cutting knife can be advanced and retracted, and the cutting knife cuts the laterally sealed portion when advanced.

In this case, when the packaging material is nipped by the seal block and the dollies and is sealed by the heating means, a space is formed between two seal lines, and the liquid food remains within the space.

When the packaging material is cut by the cutting knife, the liquid food remaining within the space leaks out and adheres to the cutting knife. However, since the cleaning medium is supplied to the cutting knife by the cleaning medium supply means, the cutting knife is cleaned immediately.

Accordingly, the liquid food adhering to the cutting knife is prevented from dirtying the cut ends of packaging material.

In still another cutter cleaning apparatus for a filling machine according to the present invention, there are provided a seal block disposed in the vicinity of the laterally sealed portion, heating means disposed on the seal block, and a dolly disposed to face the seal block and adapted to press the packaging material filled with the liquid food.

The cutting knife is disposed to face the laterally sealed portion on the downstream side of the seal block with respect to the direction of transport of the packaging material.

In this case, since the sealing operation for making the laterally sealed portion and the cutting operation for cutting the sealed portion are performed at different locations, timing adjustment is facilitated, and the processing speed of the filling machine can be increased. Also, since the space surrounding the cutting knife increases, the installation position and angle of the cleaning medium supply means can be set easily.

In still another cutter cleaning apparatus for a filling machine according to the present invention, the cutting knife is disposed such that it can be advanced and retracted, and the cutting knife cuts the laterally sealed portion when advanced.

In still another cutter cleaning apparatus for a filling medium according to the present invention, the cutting knife is disposed such that it can be rotated, and the cutting knife cuts the laterally sealed portion when rotated.

BEST MODE FOR CARRYING OUT THE INVENTION

The embodiments of the present invention will next be described in detail with reference to the drawings.

Figure 1:
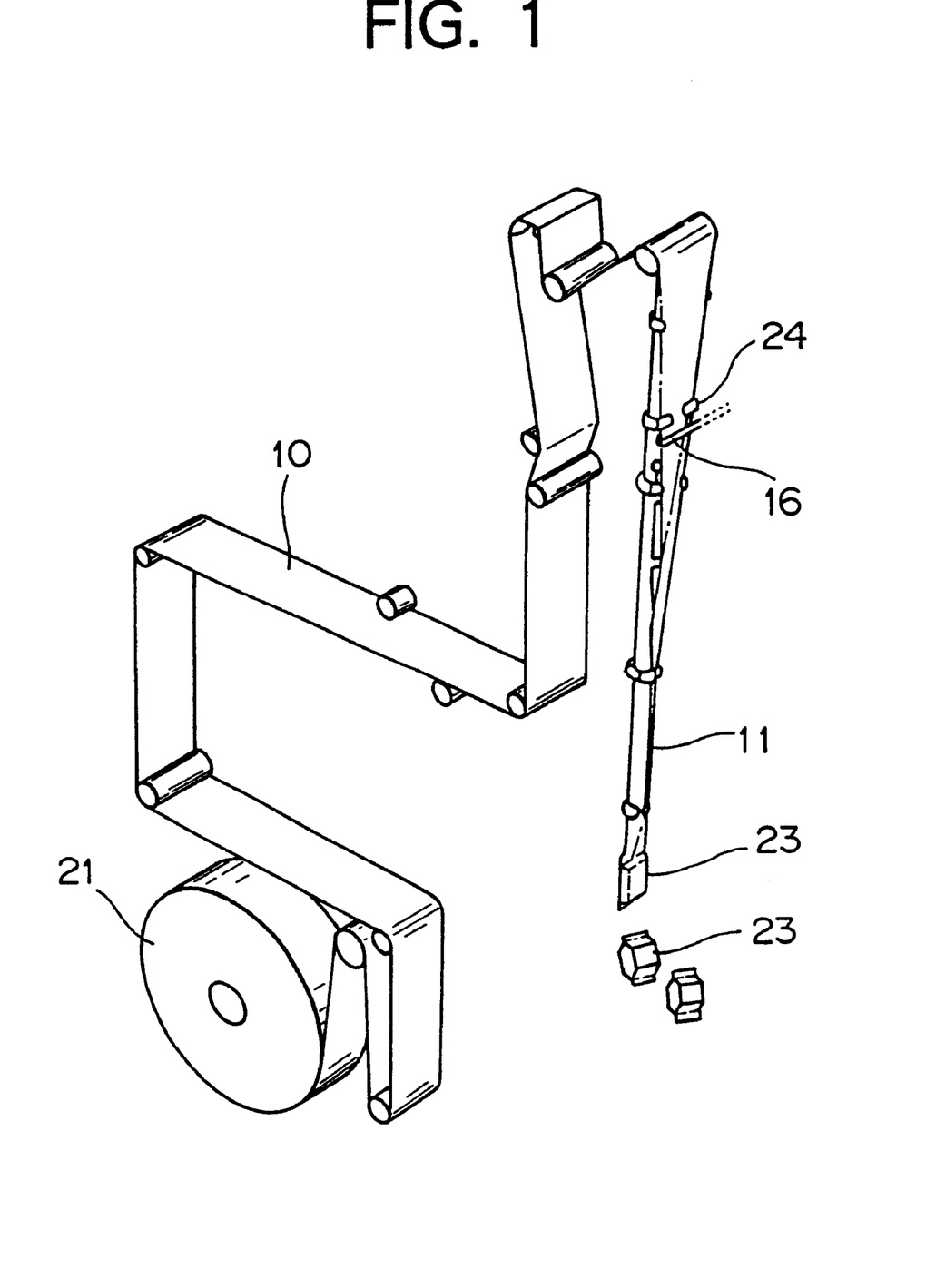
FIG. 1 is a conceptual view of the filling machine in a first embodiment of the present invention.

FIG. 1 is a conceptual view of a filling machine in a first embodiment of the present invention.

In this drawing, numeral 10 denotes a web-shaped packaging material made of flexible laminate. The packaging material 10 is manufactured by an unillustrated packaging material manufacturing apparatus and is set in the filling machine in the form of a reel 21. The packaging material 10 is pulled out by unillustrated drive mechanisms of the filling machine, so that the packaging material is transferred within the filling machine. The packaging material 10 is formed by laminating, for example, polyethylene resin film, aluminum foil, paper substrate, and polyethylene resin film in this order from the inside of the packaging material 10.

The packaging material 10 is guided by guides 24 and continuously sealed in the longitudinal direction by an unillustrated sealing apparatus, so that a tubular packaging material 11 is produced. While the tubular packaging material 11 is transported downward, liquid food is charged into the packaging material 11 from above via a charging pipe 16. The packaging material 11 filled with the liquid food is then nipped from opposite lateral sides by unillustrated cutting jaw and heat seal jaw, so that the packaging material 11 is sealed laterally at predetermined intervals. Thus, a series of packaging containers 23 having a pillow-like original shape are fabricated.

Subsequently, through use of an unillustrated cutting knife, the packaging material 11 is cut at a point between two seal lines formed at each laterally sealed portion in order to separate the original-shape containers 23. Each of the separated original-shape containers 23 is folded along preset creases into a desired shape. Thus are completed a plurality of packaging containers, each containing the same amount of liquid food.

Next, a description will be given of a sealing apparatus of the present invention.

Figure 2:
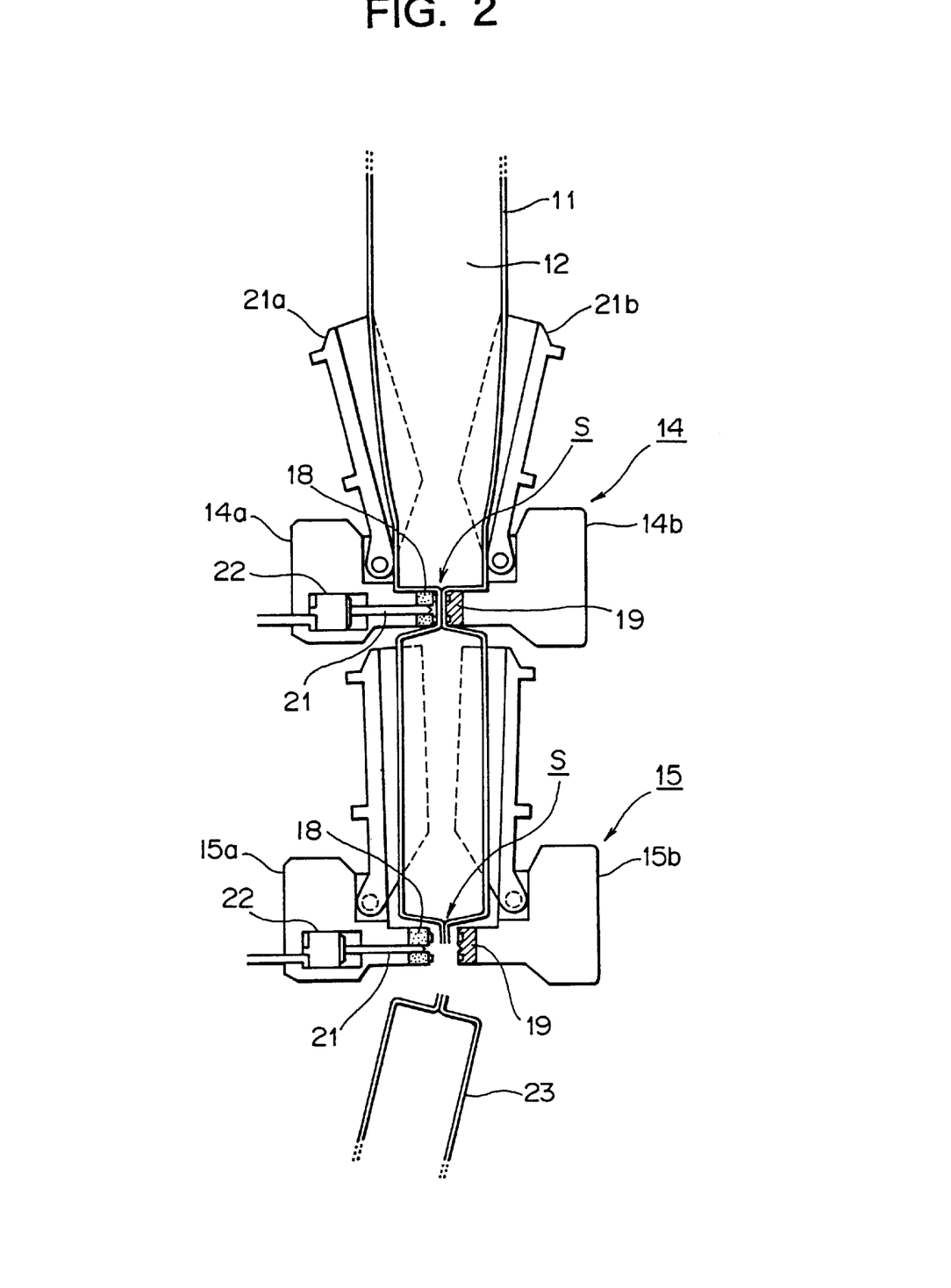
FIG. 2 is a sectional view of a main portion of the filling machine in the first embodiment of the present invention.

FIG. 2 is a sectional view of a main portion of the filling machine in the first embodiment of the present invention.

In this drawing, numeral 11 denotes the tubular packaging material which is formed by continuously sealing the web-shaped packaging material 10 (FIG. 1) in the longitudinal direction. Liquid food 12 is accommodated within the packaging material 11.

The packaging material 11 is continuously transported downward and is nipped by two sealing/cutting units 14 and 15 below the surface of the liquid food 12. As a result, the packaging material 11 is sealed laterally at predetermined intervals, so that strip-shaped laterally sealed portions S are formed. Subsequently, each of the laterally sealed portions S is cut by a cutting knife 21 at a location between two seal lines. Thus are produced the original-shape containers 23, each containing the same amount of the liquid food 12. To this end, the sealing/cutting unit 14 includes a cutting jaw 14a and a heat seal jaw 14b, while the sealing/cutting unit 15 includes a cutting jaw 15a and heat seal jaw 15b.

In the present embodiment, in order to increase the processing speed of the filling machine, two sealing/cutting units 14 and 15 having the same structure are disposed and are alternately operated such that a difference of a half cycle is produced between the process cycles of the sealing/cutting units 14 and 15.

A cutting bar 18 is attached to the tip end of each of the cutting jaws 14a and 15a, and a seal block 19 having an inductor or heat ribbon is attached to the tip end of each of the heat seal jaws 14b and 15b. When the cutting jaws 14a and 15a and the heat seal jaws 145b and 15b are advanced, the packaging material 11 is nipped from both sides by the cutting bars 18 and the seal blocks 19, so that the opposing surfaces of the packaging material 11 are brought into contact with each other and sealed laterally.

The cutting knife 21 is disposed at the center of each of the cutting jaws 14a and 15b such that the cutting knife 21 can be advanced and retracted. The cutting knife 21 has a flat shape extending in the lateral direction. When the cutting knife 21 is advanced, the laterally sealed portion S is cut at a position between two seal lines thereof.

To carry out the cutting operation, a cylinder 22 is disposed on the rear end of the cutting knife 21. The cutting knife 21 can be advanced and retracted through supply and discharge of pressurized air or the like to and from the cylinder 22.

Numerals 21a and 21b denote a pair of forming flaps. The forming flaps 21a and 21b are swingably supported with respect to the cutting jaw 14a or 15a and the heat seal jaw 14b or 15b and are adapted to surround and guide the packaging material 11. The forming flaps 21a and 21b form the tubular packaging material 11 into a rectangular shape.

The sealing/cutting unit 14 is located at the sealing/cutting start position in FIG. 2. At the sealing/cutting start position, the cutting jaw 14a and the heat seal jaw 14b are advanced in order to nip the packaging material 11 from both sides thereof, thereby bringing the opposing surfaces into contact with each other.

The sealing/cutting unit 14 is then moved downward while nipping the packaging material 11. During the downward movement, the laterally sealed portion S is formed.

Meanwhile, the sealing/cutting unit 15 is located at the sealing/cutting end position in FIG. 2. Immediately before the sealing/cutting unit 15 reaches the sealing/cutting end position, the cutting knife 21 of the sealing/cutting unit 15 is advanced to cut the laterally sealed portion S at a position between two seal lines thereof, so that the original-shape container 23 is separated from the packaging material 11.

After the laterally sealed portion S is cut at a position between two seal lines, thereof, the cutting jaw 15a and the heat seal jaw 15b of the sealing/cutting unit 15 are retracted and moved upward while being swung in order to reach the sealing/cutting start position. When the cutting jaw 15a and the heat seal jaw 15b start their advance movements after the sealing/cutting unit 15 has reached the sealing/cutting start position, the cutting knife 21 of the sealing/cutting unit 14 is advanced to cut the laterally sealed portion S at a position between two seal lines thereof, thereby separating the original-shape container 23.

An unillustrated cylinder mechanism is disposed on each of the sealing/cutting units 14 and 15. Through supply of pressurized air or the like to the cylinder mechanism, the cutting jaw 14a or 15a and the heat seal jaw 14b or 15b are drawn each other in order to increase the pressing force during the sealing operation.

The pressing force applied between the cutting jaw 14a or 15 a and the heat seal jaw 14b or 15b is released within a short period of time, and the sealing/cutting units 14 and 15 are moved to the sealing/cutting end positions.

In the filling machine heaving the above-described structure, when the packaging material 11 filled with the liquid food 12 is nipped by the sealing/cutting units 14 and 15, a space is formed between two seal lines, and the liquid food 12 remains within the space.

Consequently, when the packaging material 11 is cut by the cutting knife 21, the liquid food 12 remaining within the space leaks out and adheres to the cutting knife 21.

Next, a description will be given of a cutter cleaning apparatus for the filling machine in which the cutting knife 21 is cleaned whenever the packaging material 11 is cut.

Figure 3:
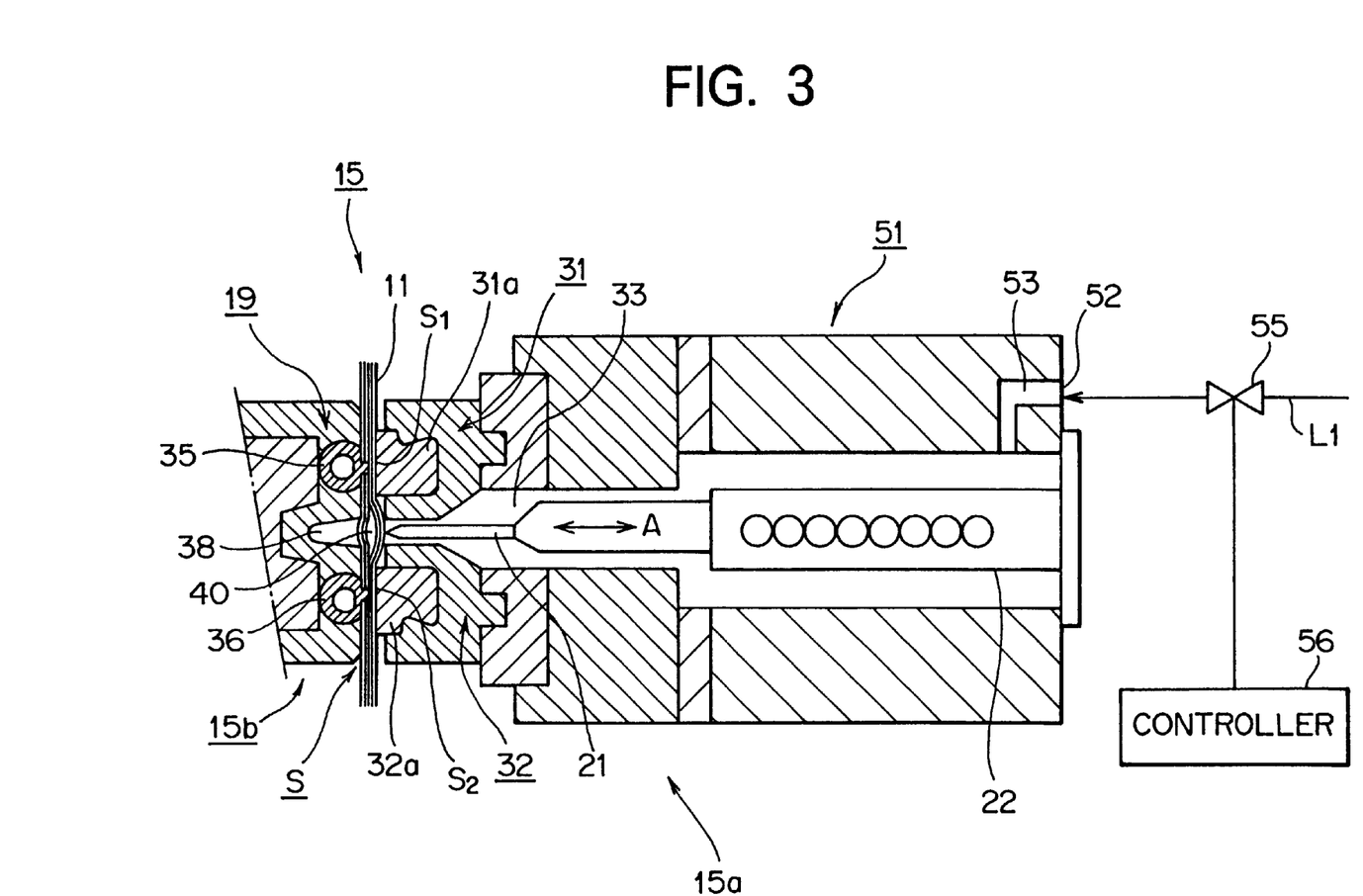
FIG. 3 is a schematic view of the cutter cleaning apparatus of the filling machine in the first embodiment of the present invention.
Figure 4:
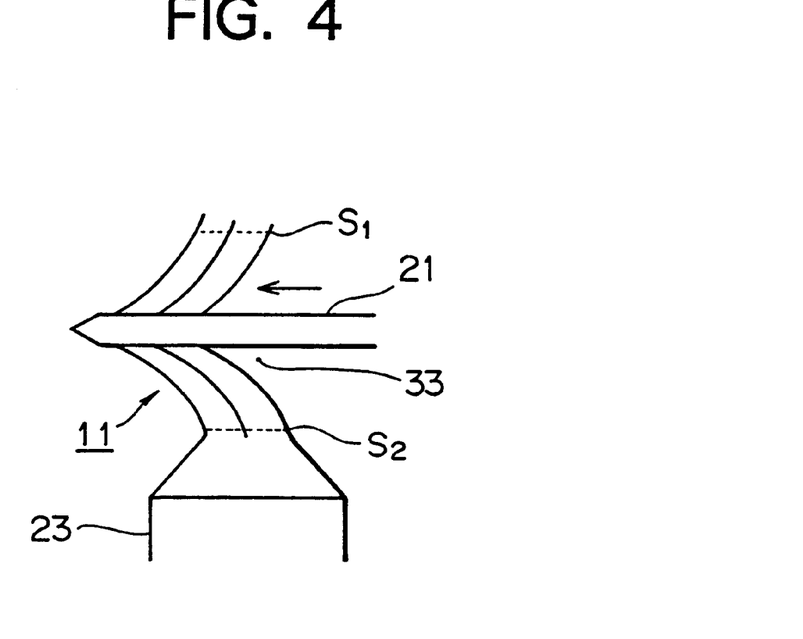
FIG. 4 is a diagram showing a first state of the cutting knife in the first embodiment of the present invention.
Figure 5:
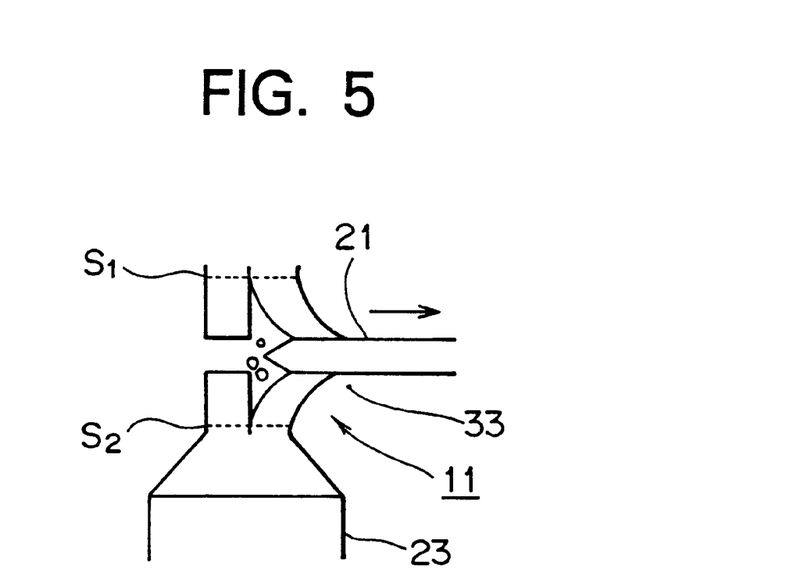
FIG. 5 is a diagram showing a second state of the cutting knife in the first embodiment of the present invention.

FIG. 3 is a schematic view of the cutter cleaning apparatus of the filling machine in the first embodiment of the present invention; FIG. 4 is a diagram showing a first state of the cutting knife in the first embodiment of the present invention; and FIG. 5 is a diagram showing a second state of the cutting knife in the first embodiment of the present invention. Since the two sealing/cutting units 14 (FIG. 2) and 15 have the identical structure, only the sealing/cutting unit 15 will be described.

In these drawings, numeral 11 denotes the tubular packaging material, numeral 15 denotes the sealing/cutting unit, numeral 15a denotes the cutting jaw, numeral 15b denotes the heat seal jaw, numeral 19 denotes the seal block, and numeral 21 denotes the cutting knife.

The cutting jaw 15a has a pair of cutting rails 31 and 32. The cutting knife 21 is disposed between the cutting rails 31 and 32 and is advanced and retracted along the direction of arrow A by a cylinder 22.

The cutting rails 31 and 32 are disposed to face the seal block 19 and respectively have dollies 31a and 32a extending along the cutting rails 31 and 32. The laterally sealed portion S of the packaging material 11 is strongly pressed by the dollies 31a and 32a. Therefore, the surfaces of the dollies 31a and 32a facing the seal block 19 are made flat. In the laterally sealed portion S, first and second seal lines $S_1$ and $S_2$ are formed at positions corresponding to the dollies 31a and 32a.

The seal block 19 has first and second induction heaters 35 and 36 serving as heating means at positions corresponding to the dollies 31a and 32a.

Between the first and second induction heaters 35 and 36 is formed a groove 38 which receives the tip end of the cutting knife 21 when the cutting knife 21 is advanced. The groove 38 extends horizontally along the first and second induction heaters 35 and 36. Numeral 40 denotes a space which is formed between the first and second seal lines $S_1$ and $S_2$ and in which the liquid food 12 remains.

The cutting jaw 15a has a housing 51 on the rear side (on the right side in the drawing) of the cutting rails 31 and 32, and the cutting rails 31 and 32 are supported by the housing 51. The cutting knife 21 and the cylinder 22 are surrounded by the housing 51, so that a closed space 33 for accommodating a cleaning medium such as cleaning water is formed between the cutting knife 21 and the cylinder 22 and the housing 51.

Via a cleaning medium passage 53, the closed space 33 is connected to a port 52 at a predetermined location of the housing 51. Cleaning wafer supplied from an unillustrated cleaning medium supply source via a line L1 is supplied to the closed space 33 via the port 52 and the cleaning medium passage 53.

Also, an open/close valve 55 is disposed in the line L1, and is opened and closed by a controller 56. The open/close valve 55 is opened at a predetermined timing after the cutting jaw 15a and the heat seal jaw 15b are advanced, while the sealing/cutting unit 15 is located at the sealing/cutting start position, in order to nip the packaging material 11 from both sides thereof to thereby bring the opposing surfaces into contact with each other. The open/close valve 55 is then closed after the closed space 33 is supplied and filled with the cleaning water. In the present embodiment, the closed space 33, the port 52, the cleaning medium passage 53 and the line L1 constitute the cleaning medium supply means.

After that, immediately before the sealing/cutting unit 15 reaches the sealing/cutting end position, the cutting knife is advanced along the direction of the arrow, as shown in FIG. 4, in order to cut the laterally sealed portion S at a position between the first and second seal lines $S_1$ and $S_2$, thereby separating the original-shape container 23. At this time, the closed space 33 is sealed by the laterally sealed portion S and the cutting knife 21.

Subsequently, after the laterally sealed portion S is cut at a position between the first and second seal lines $S_1$ and $S_2$, the cutting knife 21 is retracted along the direction of the arrow, as shown in FIG. 5. Therefore, the cleaning water within the closed space 33 leaks out through a gap between the end surfaces of the cut packaging material 11, and at this time, the cutting knife 21 is cleaned by the cleaning water.

As a result, even when the liquid food 12 remaining within the space 40 adheres to the cutting knife 21, the cutting knife 21 is cleaned immediately. Accordingly, the liquid food 12 adhering to the cutting knife 21 is prevented from dirtying the cut ends of packaging material 11.

Next, a description will be given of a second embodiment of the present invention.

Figure 6:
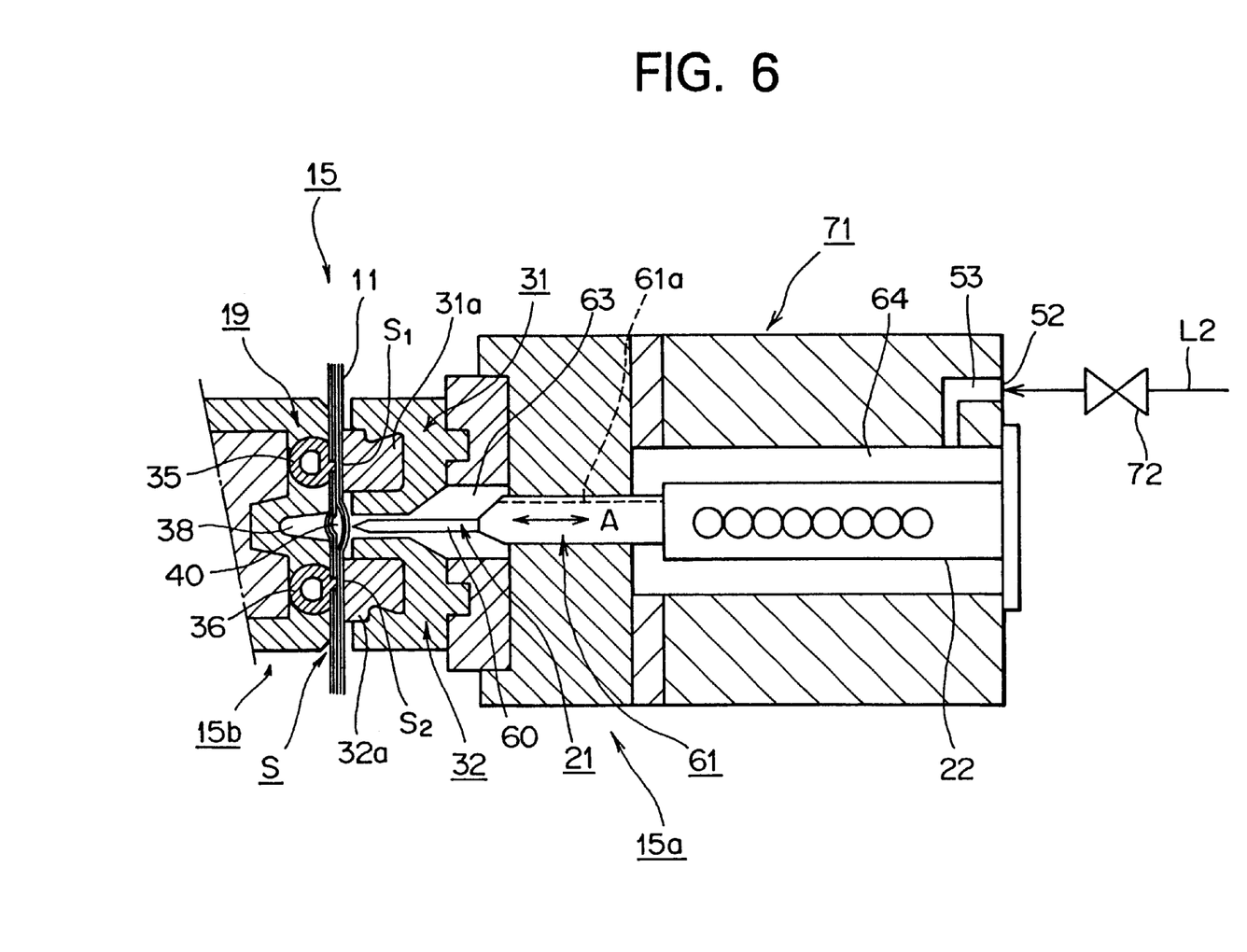
FIG. 6 is a schematic view of the cutter cleaning apparatus of the filling machine in a second embodiment of the present invention.
Figure 7:
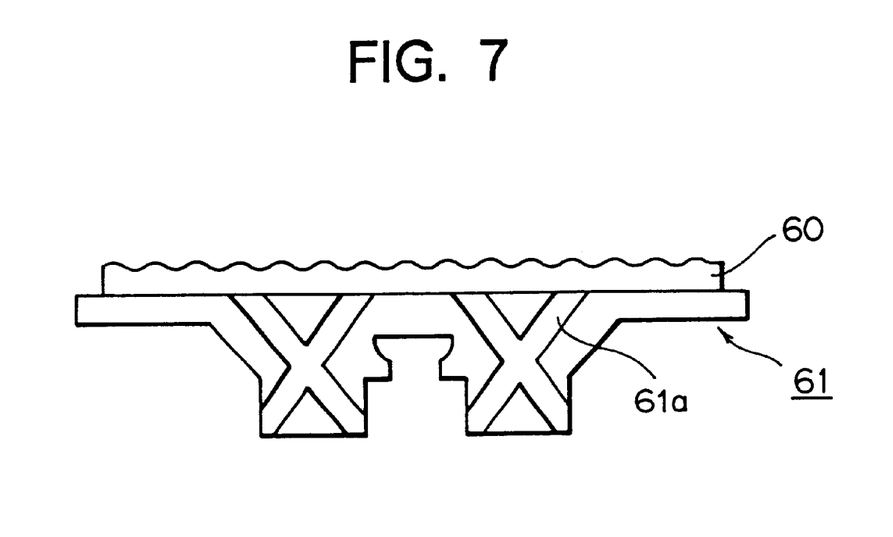
FIG. 7 is a plan view of the cutting knife in the second embodiment of the present invention.
Figure 8:
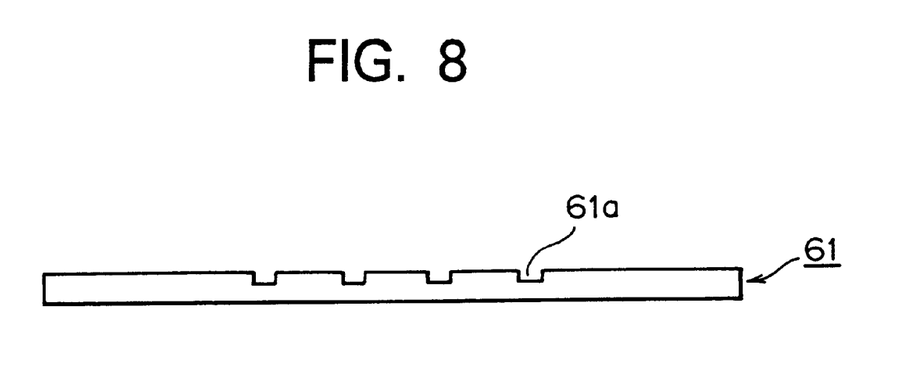
FIG. 8 is a sectional view of the cutting knife in the second embodiment of the present invention.

FIG. 6 is a schematic view of the cutter cleaning apparatus of the filling machine in the second embodiment of the present invention; FIG. 7 is a plan view of the cutting knife in the second embodiment of the present invention; and FIG. 8 is a sectional view of the cutting knife in the second embodiment of the present invention. The components identical to those of the first embodiment are denoted by the same reference numerals, and description therefor will be omitted.

In the second embodiment, a knife holder 61 of the cutting knife 21 slides in contact with the inner wall of a housing 71, and a space 63 is formed on the front side of the sliding portion between the knife holder 61 and the housing 71, i.e., on the side where a knife body 60 exists, while a closed space 64 is formed on the rear side of the sliding portion, i.e., on the side where the cylinder 22 exists. Further, a groove 61a is formed on the knife holder 61 to establish communication between the space 63 and the closed space 64.

In the present embodiment, as shown in FIG. 7, the groove 61a is formed to have an X-shaped pattern, so that the cleaning water is supplied uniformly in the longitudinal direction of the knife body 60. The groove 61a may be formed to have a differently shaped pattern. In the present embodiment, the groove 61a is formed only on one face of the knife holder 61. However, the groove 61a may be formed on both faces of the knife holder 61.

The closed space 64 is connected, via the cleaning medium passage 53, to the port 52 formed at a predetermined location of the housing 71, and the cleaning wafer supplied from an unillustrated cleaning medium supply source via a line L2 is always supplied to the closed space 64 via the port 52 and the cleaning medium passage 53. Also, a regulator 72 is disposed on the line L2. Therefore, through adjustment of the regulator 72, the amount of the cleaning water supplied from the cleaning medium supply source to the closed space 64 can be adjusted. In the present embodiment, the closed space 64, the port 52, the cleaning medium passage 53, and the line L2 constitute the cleaning medium supply means.

Accordingly, the cleaning water supplied from the port 52 to the closed space 64 is fed to the knife body 60 within the space 63 via the groove 61a and then spreads in the longitudinal direction of the knife body 60 in order to clean the knife body 60.

As a result, even when the liquid food 12 (FIG. 2) remaining within the space 40 leaks out and adheres to the cutting knife 21, the cutting knife 21 is cleaned immediately. Accordingly, the liquid food 12 adhering to the cutting knife 21 is prevented from dirtying the cut ends of packaging material 11.

Also, since the space 63 is not required to be filled with the cleaning water, the amount of the cleaning water to be used can be reduced. In addition, since the supply of the cleaning water does not have to be controlled through use of the open/close valve 55 (FIG. 3), the controller 56, and the like, the structure of the cutter cleaning apparatus can be simplified.

Next, a description will be given of a third embodiment of the present invention.

Figure 9:
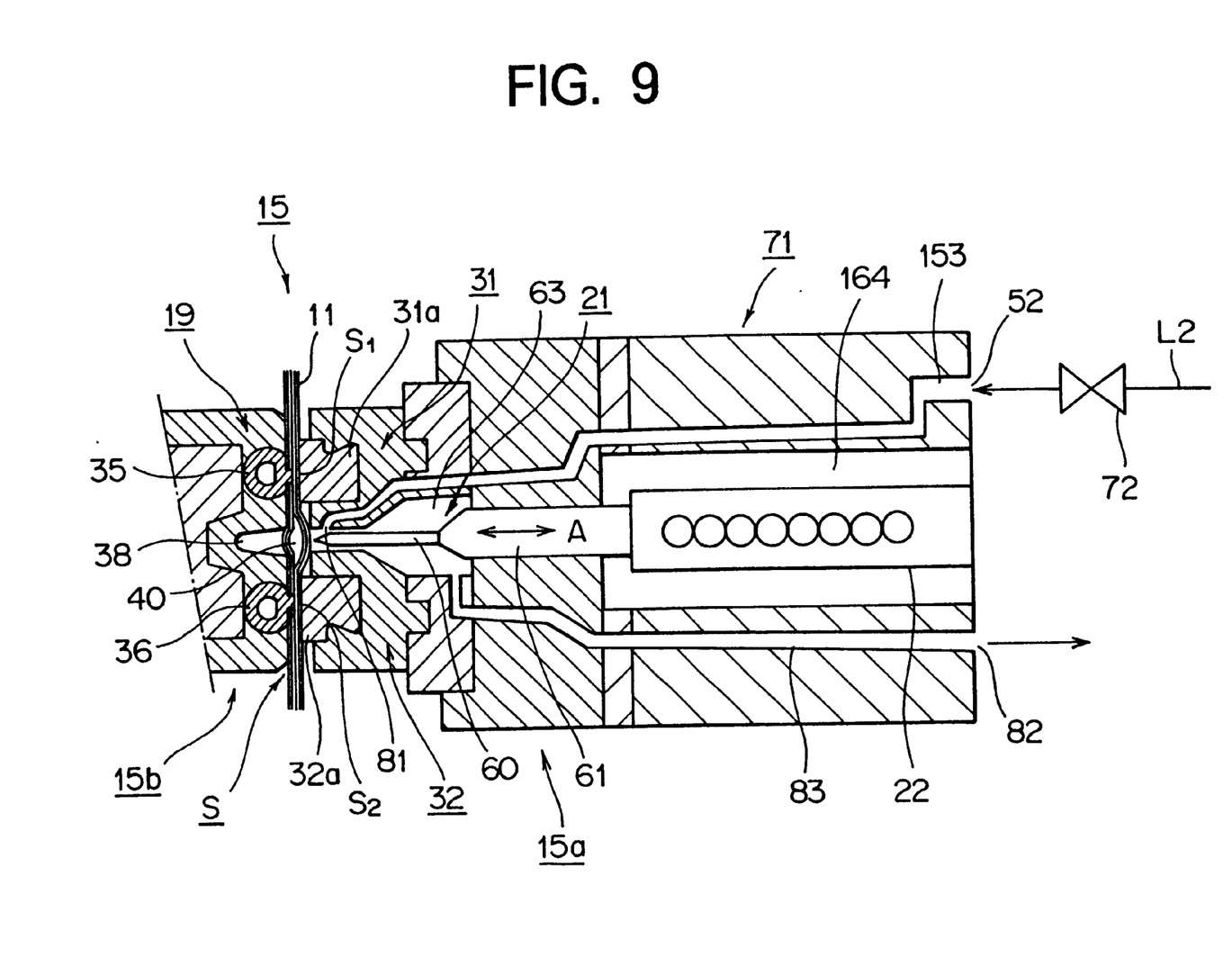
FIG. 9 is a schematic view of the cutter cleaning apparatus of the filling machine in a third embodiment of the present invention.

FIG. 9 is a schematic view of the cutter cleaning apparatus of the filling machine in the third embodiment of the present invention. The components identical to those of the second embodiment are denoted by the same reference numerals, and descriptions therefor will be omitted.

In the present embodiment, a nozzle 81 serving as a cleaning medium jetting opening if formed in the cutting rail 31 such that the nozzle 81 is located in the vicinity of the tip end of the cutting knife 21, and the nozzle 81 and the port 52 are connected via a cleaning medium passage 153.

The space 63 is formed on the knife body 60 side of the sliding portion between the knife holder 61 and the housing 71, while a space 164 is formed on the cylinder 22 side of the sliding portion. Further, the space 63 and a port 82 are connected via a cleaning medium drain passage 83.

In the present embodiment, the port 52, the nozzle 81, the port 82, the cleaning medium drain passage 83, the cleaning medium passage 153, and the line L2 constitute the cleaning medium supply means.

Accordingly, the cleaning water supplied from the port 52 to the cleaning medium passage 153 is jetted from the nozzle 81 toward the tip end of the cutting knife 21 in order to clean the cutting knife 21. The cleaning water that has been used for cleaning is drained from the port 82 via the cleaning medium drain passage 83.

As a result, even when the liquid food 12 (FIG. 2) remaining within the space 40 leaks out and adheres to the cutting knife 21, the cutting knife is cleaned immediately. Accordingly, the liquid food 12 adhering to the cutting knife 21 is prevented from dirtying the cut ends of packaging material 11.

Also, since the space 63 is not required to be filled with the cleaning water, the amount of the cleaning water to be used can be reduced. In addition, since the supply of the cleaning water does not have to be controlled through use of the open/close valve 55 (FIG. 3), the controller 56, and the like, the structure of the cutter cleaning apparatus can be simplified.

In the present embodiment, the nozzle 81 is formed as the cleaning medium jetting opening. However, an unillustrated slit may be formed as the cleaning medium jetting opening. Although the nozzle 81 is formed in the cutting rail 31 in the present embodiment, the nozzle 81 may be formed in the cutting rail 32. Further, the nozzle 81 may be formed in both of the cutting rails 31 and 32.

Next, a description will be given of a fourth embodiment of the present invention.

Figure 10:
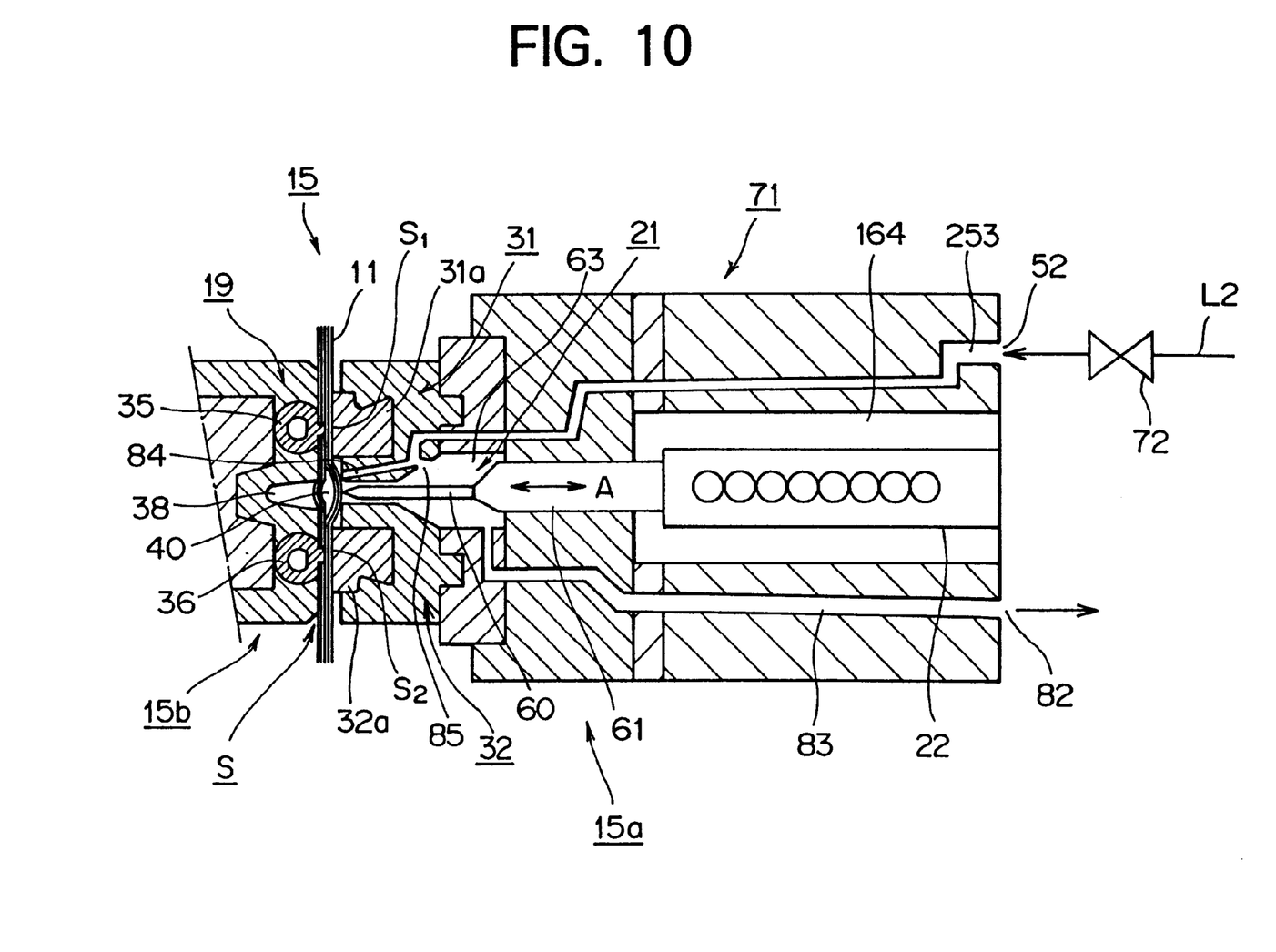
FIG. 10 is a schematic view of the cutter cleaning apparatus of the filling machine in a fourth embodiment of the present invention.

FIG. 10 is a schematic view of the cutter cleaning apparatus of the filling machine in the fourth embodiment of the present invention. The components identical to those of the third embodiment are denoted by the same reference numerals, and description therefor will be omitted.

In the present embodiment, there are formed, in the cutting rail 31, a nozzle 84 serving as a main cleaning medium jetting opening and directed to the space 40 of the laterally sealed portion S where the liquid food remains, and a nozzle 85 serving as a sub cleaning medium jetting opening and directed to the knife body 60. The nozzles 84 and 85 are connected with the port 52 via a cleaning medium passage 253.

The space 63 is formed on the knife body 60 side of the sliding portion between the knife holder 61 and the housing 71, while the space 164 is formed on the cylinder 22 side of the sliding portion. Further, the space 63 and the port 82 are connected via the cleaning medium drain passage 83.

In the present embodiment, the port 52, the port 82, the cleaning medium drain passage 83, the nozzles 84 and 85, the cleaning medium passage 253, and the line L2 constitute the cleaning medium supply means.

Accordingly, the cleaning water supplied from the port 52 to the cleaning medium passage 253 is jetted from the nozzle 84 toward the laterally sealed portion S and from the nozzle 85, toward the knife body 60, so that the cut surfaces of the laterally sealed portion S and the cutting knife 21 are cleaned. The cleaning water that has been used for cleaning is drained from the port 82 via the cleaning medium drain passage 83.

As a result, even when the liquid food 12 (FIG. 2) remaining within the space 40 leaks out and adheres to the cutting knife 21, the cutting knife 21 is cleaned immediately. Accordingly, the liquid food 12 adhering to the cutting knife 21 is prevented from dirtying the cut ends of packaging material 11.

In the present embodiment, the nozzle 84 is formed as the main cleaning medium jetting opening, and the nozzle 85 is formed as the sub cleaning medium jetting opening. However, unillustrated slits may be formed as the main and sub cleaning medium jetting openings. Although the nozzle 84 and 85 are formed in the cutting rail 31 in the present embodiment, the nozzles 84 and 85 may be formed in the cutting rail 32. Further, the nozzles 84 and 85 may be formed in both of the cutting rails 31 and 32.

Next, a description will be given of the fifth embodiment of the present invention.

Figure 11:
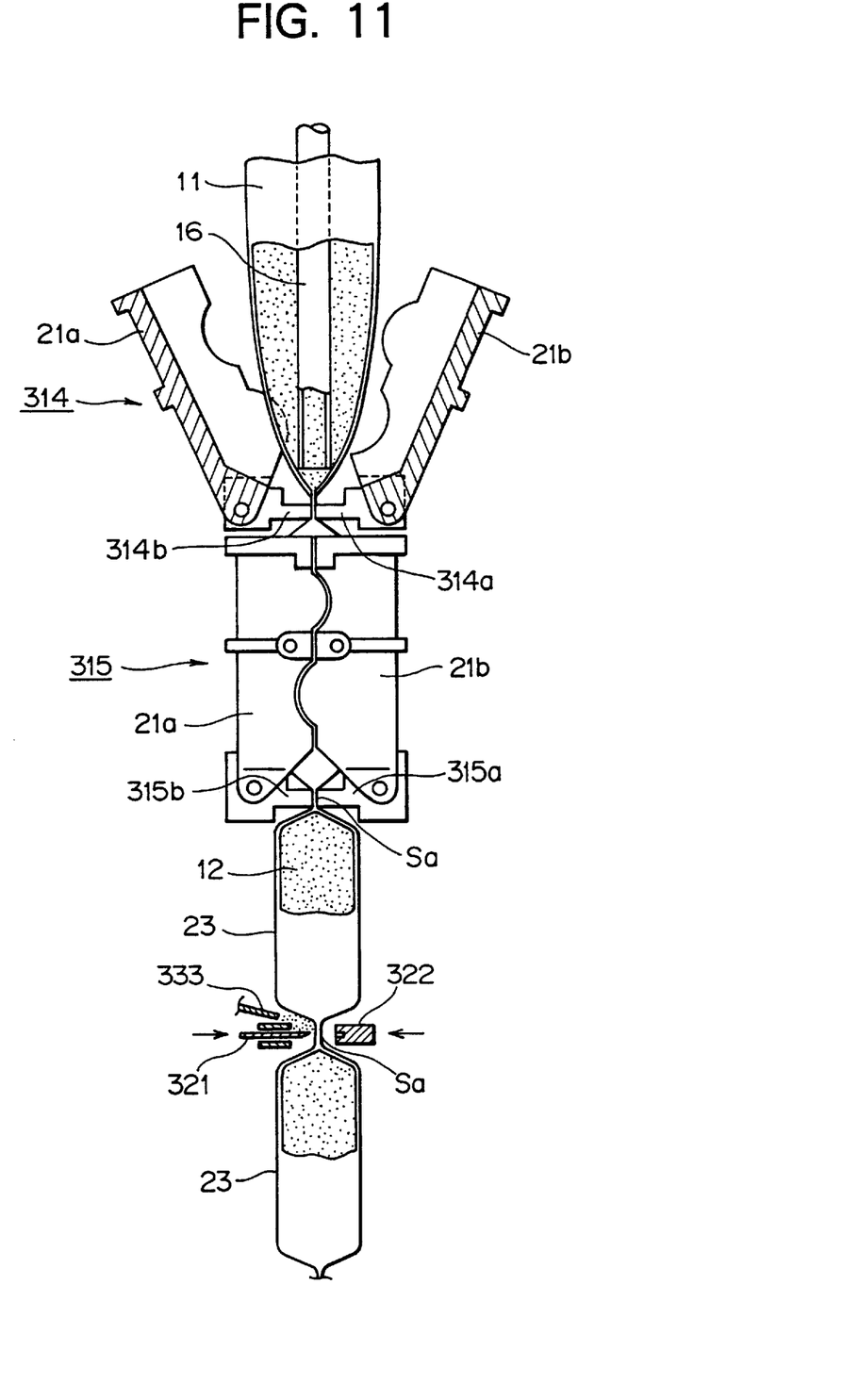
FIG. 11 is a sectional view of a main portion of the filling machine in a fifth embodiment of the present invention.

FIG. 11 is a sectional view of the main portion of the filling machine in the fifth embodiment of the present invention. The components identical to those of the first embodiment are denoted by the same reference numerals, and descriptions therefor will be omitted.

In the present embodiment, the packaging material 11 is continuously transported downward and is nipped by two sealing units 314 and 315, so that the packaging material 11 is sealed laterally at predetermined intervals, and strip-shaped laterally sealed portions Sa are formed. Subsequently, each of the laterally sealed portions Sa is cut at the center thereof. Thus are produced the original-shape containers 23, each containing the same amount of the liquid food 12.

To this end, the sealing unit 314 has a heat seal jaw 314a and a counter jaw 314b both disposed to face the laterally sealed portion Sa, and the sealing unit 315 has a heat seal jaw 315a and a counter jaw 315b both disposed to face the laterally sealed portion Sa. An unillustrated seal block is attached to the tip end of each of the heat seal jaws 314a and 315a. When the heat seal jaws 314a and 315a and the counter jaws 314b and 315b are advanced, the packaging material 11 is nipped from both sides by the seal blocks and the counter jaws 314b and 315b, so that the opposing surfaces of the packaging material 11 are brought into contact with each other and sealed laterally. Thus, the laterally sealed portion Sa is formed.

Under the sealing units 314 and 315, i.e., on the downstream side of the seal blocks with respect to the transport direction of the packaging material 11, a cutting knife 321 and an anvil 322 are disposed to face the laterally sealed portion Sa, such that they can be advanced and retracted. When the cutting knife 321 and the anvil 322 are respectively advanced, the laterally sealed portion Sa is cut at the center thereof, so that the original-shape container 23 is separated from the packaging material 11.

A nozzle 333 serving as the cleaning medium supply means and also serving as the cleaning medium jetting opening is disposed such that it is directed to the cutting knife 321. The cleaning water is jetted from the nozzle 333 to clean the tip end of the cutting knife 321.

Since the sealing operation for making the laterally sealed portion Sa and the cutting operation for cutting the sealed portion Sa are performed at different locations, timing adjustment between the sealing and cutting operations is facilitated, and the processing speed of the filling machine can be increased. Also, since the space surrounding the cutting knife 321 increases, the installation position and angle of the nozzle 333 can be set easily.

In the present embodiment, the nozzle 333 is formed to serve as the cleaning medium supply means and as the cleaning medium jetting opening. However, an unillustrated slit may be formed to serve as the cleaning medium supply means and as the cleaning medium jetting opening.

Next, a description will be given of a sixth embodiment of the present invention.

Figure 12:
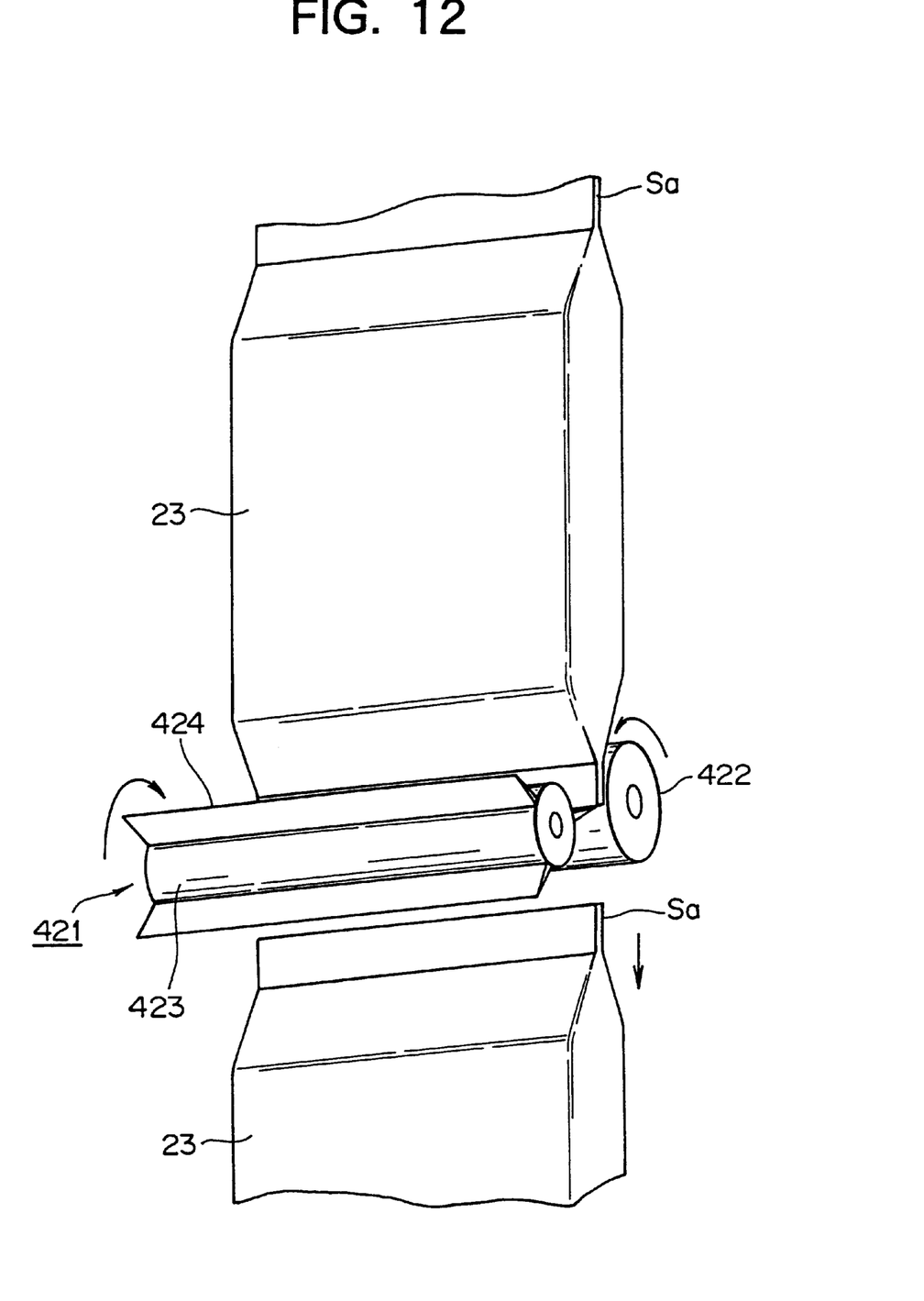
FIG. 12 is a perspective view of a main portion of the filling machine in a sixth embodiment of the present invention.
Figure 13:
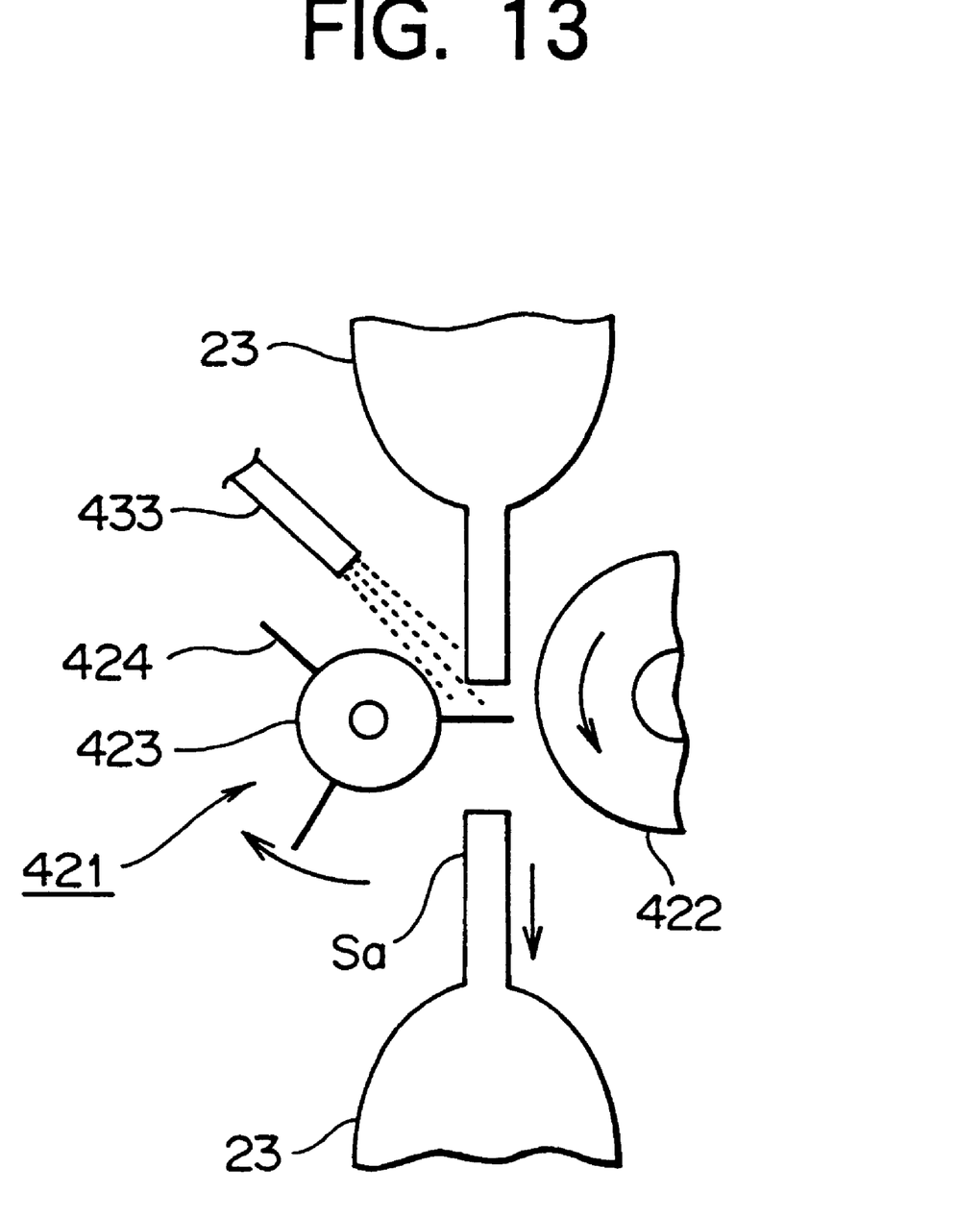
FIG. 13 is a sectional view of a main portion of the filling machine in the sixth embodiment of the present invention.

FIG. 12 is a perspective view of a main portion of the filling machine in the sixth embodiment of the present invention; and FIG. 13 is a sectional view of a main portion of the filling machine in the sixth embodiment of the present invention. The components identical to those of the fifth embodiment are denoted by the same reference numerals, and descriptions therefor will be omitted.

In the present embodiment, the packaging material 11 (FIG. 11) is continuously transported downward and is nipped by two sealing units 314 and 315, so that the packaging material 11 is sealed laterally at predetermined intervals, and strip-shaped laterally sealed portions Sa are formed. Subsequently, each of the laterally sealed portions Sa is cut at the center thereof. Thus are produced the original-shape containers 23.

Under the sealing units 314 and 315, a rotary cutting knife 421 and a rotary anvil 422 are disposed to face the laterally sealed portion Sa, such that they can be advanced and retracted and they can be rotated in the directions indicated by respective arrows. The rotary cutting knife 421 is composed of a shaft 423, and three knife bodies 424 radially extending from the outer circumference of the shaft 423. The rotary cutting knife 421 is rotated while the packaging material 11 is transported downward, in which, the timing of transport of the packaging material 11 and the timing of rotation of the rotary cutting knife 421 are adjusted such that when the laterally sealed portion Sa reaches a position between the rotary cutting knife 421 and the rotary anvil 422, one of the knife bodies 424 presses the laterally sealed portion Sa against the rotary anvil 422 in order to cut the laterally sealed portion Sa.

Also, a nozzle 433 serving as the cleaning medium supply means and also serving as the cleaning medium jetting opening is disposed such that it is directed to the tip of the rotary cutting knife 421, i.e., the tip end of the knife body 424 at the time when the knife body 424 is moved to a position where the knife body 424 presses the laterally sealed portion Sa against the rotary anvil 422. The cleaning water is jetted from the nozzle 433 to clean the tip end of the knife body 424.

In the present embodiment, the nozzle 433 is formed to serve as the cleaning medium supply means and as the cleaning medium jetting opening. However, an unillustrated slit may be formed to serve as the cleaning medium supply means and as the cleaning medium jetting opening.

Although cleaning water is used as a cleaning medium in the above-described embodiments, cleaning gas may be used.

The present invention is not limited to the above-described embodiments. Numerous modifications and variations of the present invention are possible in light of the spirit of the present invention, and they are not excluded from the scope of the present invention.

INDUSTRIAL APPLICABILITY

The present invention is applicable to an apparatus for manufacturing packaging containers containing liquid food or the like.

What is claimed is:

1. A cutter cleaning apparatus for a filling machine in which a web-shaped packaging material is continuously sealed longitudinally to be formed into a tubular shape and a liquid food is filled into a section of the tubular packaging material, said apparatus comprising:
    (a) a seal block;
    (b) heating means disposed on said seal block;
    (c) at least one seal member disposed facing said seal block and adapted to press a laterally extending portion of the filled section of the tubular packaging material against said seal block to form a pair of parallel and spaced seal lines, with liquid food trapped therebetween, extending across the laterally extending portion;
    (d) a cutting knife disposed in association with said seal member;
    (e) drive means for advancing and retracting said cutting knife so that said cutting knife cuts the laterally extending portion, between said seal lines, when advanced; and
    (f) cleaning medium supply means for supplying a cleaning medium to said cutting knife to clean liquid food from said cutting knife.

2. A cutter cleaning apparatus for a filling machine according to claim 1, wherein said cleaning medium supply means comprises a closed space that surrounds at least the tip end of said cutting knife, and a cleaning medium passage connected to said closed space and adapted to supply the cleaning medium to said closed space.

3. A cutter cleaning apparatus for a filling machine according to claim 2, wherein
    (a) said cutting knife is composed of a knife body and a knife holder for supporting said knife body; and
    (b) said closed space surrounds said knife body and said knife holder.

4. A cutter cleaning apparatus for a filling machine according to claim 1, wherein:
    (a) said cutting knife is composed of a knife body, and a knife holder which is mounted within a housing for sliding movement relative to the housing;
    (b) said cleaning medium supply means comprises a closed space that is formed on a rear side of a support portion of the housing which is in sliding contact with said knife holder, and a cleaning medium passage connected to said closed space and adapted to supply the cleaning medium to said closed space and;
    (c) a groove is formed in said knife holder to supply the cleaning medium from said closed space to a front side of the support portion.

5. A cutter cleaning apparatus for a filling machine according to claim 1, wherein said cleaning medium supply means comprises a cleaning medium nozzle disposed in the vicinity of a tip end of said cutting knife, a cleaning medium passage connected to said cleaning medium nozzle and adapted to supply the cleaning medium to said cleaning medium nozzle and a cleaning medium drain passage for draining the cleaning medium after cleaning.

6. A cutter cleaning apparatus for a filling machine according to claim 1, wherein said cleaning medium supply means comprises a main cleaning medium nozzle disposed to direct cleaning medium onto the laterally sealed and cut portion, and a sub cleaning medium nozzle disposed to direct cleaning medium onto said cutting knife.

7. A cutter cleaning apparatus for a filling machine according to claim 1, further comprising:
    (a) a seal block;
    (b) heating means disposed on said seal blocks; and
    (c) a pair of dollies disposed facing said seal block and adapted to press the laterally extending portion of the filled section of the tubular packaging material against said seal block; and wherein
    (d) said cutting knife is disposed between said dollies such that said cutting knife can be advanced and retracted, and said cutting knife cuts the laterally sealed portion when advanced.

8. A cutter cleaning apparatus for a filling machine according to claim 1, further comprising:
    (a) a seal block;
    (b) heating means disposed on said seal blocks; and
    (c) a dolly disposed facing said seal block and adapted to press the laterally extending portion of the filled section of the tubular packaging material against said seal block; and wherein
    (d) said cutting knife is disposed to face the laterally extending portion on the downstream side of said seal block with respect to the direction of transport of said packaging material.

9. A cutter cleaning apparatus for a filling machine according to claim 8, wherein said cutting knife is mounted such that it can be advanced and retracted, and said cutting knife cuts the laterally sealed portion when advanced.

10. A cutter cleaning apparatus for a filling machine according to claim 8, wherein said cutting knife is a rotatable knife which cuts the laterally sealed portion when rotated.

11. A cutter cleaning apparatus for a filling machine according to claim 1, wherein:

a pair of parallel and spaced seal members are disposed facing said seal block; and wherein said cutting knife is disposed between said seal members.

12. A cutter cleaning apparatus for a filling machine according to claim 11 further comprising, a fill tube having a lower discharge end for the filling of the tubular packaging section; and wherein said cutting knife is positioned below said discharge end of said fill tube.

13. A cutter cleaning apparatus for a filling machine according to claim 1 further comprising, a fill tube having a lower discharge end for the filling of the tubular packaging section; and wherein said cutting knife is positioned below said discharge end of said fill tube.

* * * * *

UNITED STATES PATENT AND TRADEMARK OFFICE
CERTIFICATE OF CORRECTION

PATENT NO.     : 6,260,336 B1
DATED          : July 17, 2001
INVENTOR(S)    : Tatsumi Motomura It is certified that error appears in the above-identified patent and that said Letters Patent is hereby corrected as shown below:

<u>Title page,</u>
Item [73], "Tetra Laval Holdings & Finance, S.A. (CH)" should read
-- Tetra Laval Holdings & Finance, S.A., Switzerland --.

<u>Column 1,</u>
Line 27, "To" should read -- The --.

<u>Column 2,</u>
Line 33, "portions" should read -- portion --.

<u>Column 3,</u>
Line 2, "are" should read -- the --.

<u>Column 5,</u>
Line 18, "145b" should read -- 14b --.

<u>Column 6,</u>
Line 8, "15 a" should read -- 15a --.

<u>Column 12,</u>
Line 56, "blocks" should read -- block --.

Signed and Sealed this

Twentieth Day of August, 2002

Attest:

Attesting Officer

JAMES E. ROGAN
*Director of the United States Patent and Trademark Office*